United States Patent
Krisl et al.

(10) Patent No.: US 7,527,143 B2
(45) Date of Patent: May 5, 2009

(54) CONVEYOR BELT WITH INTERMODULAR SUPPORTED ROLLERS

(75) Inventors: Michal Krisl, Muttenz (CH); Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/592,617

(22) Filed: Nov. 3, 2006

(65) Prior Publication Data

US 2008/0105518 A1     May 8, 2008

(51) Int. Cl.
*B65G 17/24* (2006.01)
(52) U.S. Cl. ...................... 198/779; 198/853
(58) Field of Classification Search ......... 198/845–853, 198/779
See application file for complete search history.

(56) References Cited

U.S. PATENT DOCUMENTS

| | | | | |
|---|---|---|---|---|
| 1,377,450 A * | 5/1921 | Whipple | ...................... | 474/236 |
| 1,641,642 A * | 9/1927 | Pangborn | ...................... | 198/779 |
| 2,554,038 A * | 5/1951 | Lemmon | ...................... | 198/779 |
| 2,987,167 A * | 6/1961 | Franz | ...................... | 198/853 |
| 3,082,861 A * | 3/1963 | Kornylak | ...................... | 198/838 |
| 3,550,756 A * | 12/1970 | Kornylak | ...................... | 198/637 |
| 3,964,588 A * | 6/1976 | Kornylak | ...................... | 193/36 |
| 4,231,469 A * | 11/1980 | Arscott | ...................... | 198/779 |
| 4,821,869 A * | 4/1989 | Hodlewsky | ...................... | 198/779 |
| 4,880,107 A * | 11/1989 | Deal | ...................... | 198/779 |
| 4,909,380 A * | 3/1990 | Hodlewsky | ...................... | 198/779 |
| 4,925,016 A * | 5/1990 | Lapeyre | ...................... | 198/834 |
| 4,993,540 A * | 2/1991 | van Capelleveen | ...................... | 198/779 |
| 5,096,050 A * | 3/1992 | Hodlewsky | ...................... | 198/779 |
| 5,224,583 A * | 7/1993 | Palmaer et al. | ...................... | 198/779 |
| 5,238,099 A * | 8/1993 | Schroeder et al. | ........... | 198/456 |
| 5,261,525 A * | 11/1993 | Garbagnati | ...................... | 198/779 |
| 5,330,045 A * | 7/1994 | Hodlewsky | ...................... | 198/779 |
| 5,404,997 A * | 4/1995 | Schreier et al. | ...................... | 198/779 |
| 5,706,934 A * | 1/1998 | Palmaer et al. | ...................... | 198/853 |
| 6,044,956 A * | 4/2000 | Henson et al. | ......... | 198/370.02 |
| 6,148,990 A * | 11/2000 | Lapeyre et al. | ...................... | 198/779 |
| 6,209,714 B1 * | 4/2001 | Lapeyre et al. | ...................... | 198/779 |
| 6,257,397 B1 * | 7/2001 | Kilby et al. | ...................... | 198/852 |
| 6,315,109 B1 * | 11/2001 | Dean | ...................... | 198/786 |
| 6,367,616 B1 * | 4/2002 | Lapeyre et al. | ...................... | 198/779 |
| 6,398,015 B1 * | 6/2002 | Sedlacek et al. | ...................... | 198/779 |

(Continued)

*Primary Examiner*—James R Bidwell
(74) *Attorney, Agent, or Firm*—Hodgson Russ LLP

(57) ABSTRACT

The invention may include a series of rows of belt modules. A first one of the rows may have a plurality of hinge elements along an end of the first row. A second one of the rows may have a plurality of hinge elements along an end of the second row. The plurality of hinge elements of the first row may be interleaved with the plurality of hinge elements of the second row. A hinge pin may extend through the plurality of hinge elements of both the first row and the second row so as to pivotally join the first row to the second row. A roller may be supported from a first module of the first row and supported from a second module of the first row, so that the roller resides between the first module and the second module and so that the roller extends above the modules in order to allow an object, which is to be conveyed by the conveyor belt, to be supported on the roller. The modules may be moved in a belt travel direction in order to convey the object from a first location to a second location.

23 Claims, 9 Drawing Sheets

U.S. PATENT DOCUMENTS

| | | | |
|---|---|---|---|
| 6,494,312 B2 * | 12/2002 | Costanzo | 198/779 |
| 6,585,110 B2 * | 7/2003 | Layne et al. | 198/852 |
| 6,932,211 B2 * | 8/2005 | Wieting et al. | 198/853 |
| 6,997,309 B2 * | 2/2006 | Stebnicki et al. | 198/850 |
| 7,168,557 B2 * | 1/2007 | Mitchell et al. | 198/852 |
| 7,246,700 B2 * | 7/2007 | Stebnicki et al. | 198/853 |
| 2001/0045346 A1 * | 11/2001 | Costanzo | 198/853 |
| 2002/0020609 A1 * | 2/2002 | Lapeyre et al. | 198/779 |
| 2006/0096841 A1 * | 5/2006 | Wieting et al. | 198/779 |

* cited by examiner

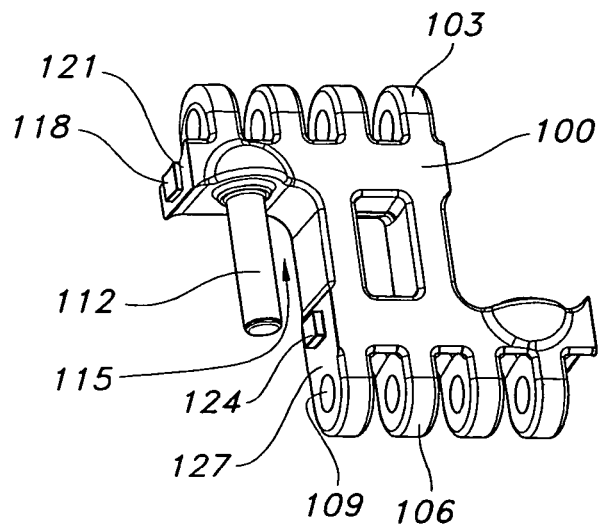
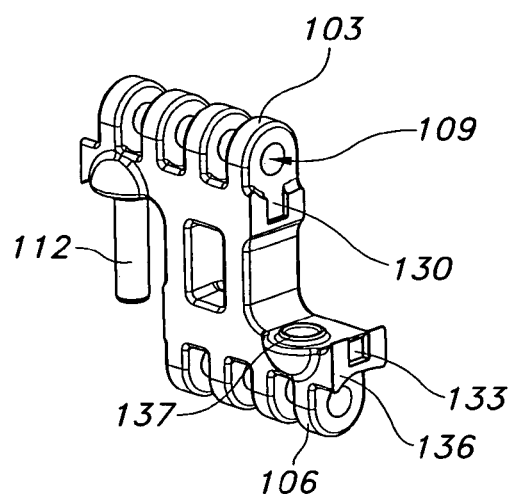
FIG. 9    FIG. 10
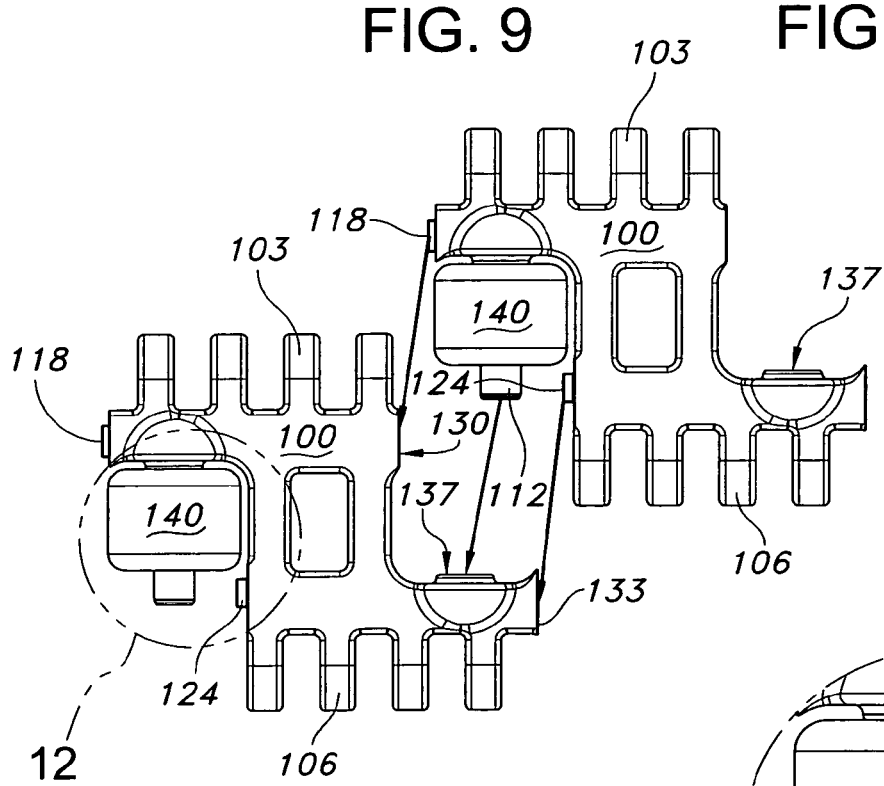
FIG. 11
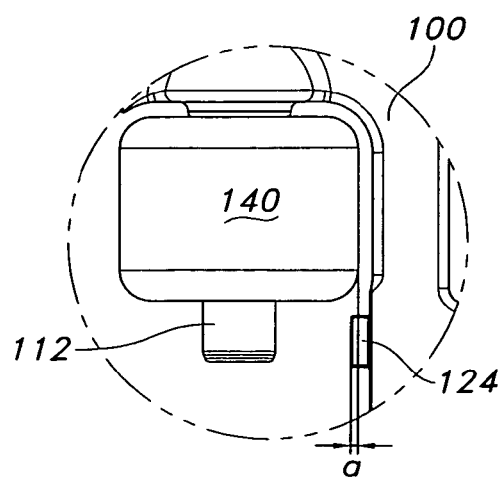
FIG. 12

CONVEYOR BELT WITH INTERMODULAR SUPPORTED ROLLERS

FIELD OF THE INVENTION

The present invention relates to conveyor belts for moving objects from one location to another location.

BACKGROUND OF THE INVENTION

The invention relates to power-driven conveyors and, more particularly, to modular conveyor belts constructed of rows of belt modules hingedly interlinked end-to-end by hinge pins.

Conventional modular conveyor belts and chains are made up of modular links, or belt modules, arranged in rows. Spaced apart link ends extending from each end of the modules include aligned apertures. The link ends along one end of a row of modules are interleaved with the link ends of an adjacent row. A pivot rod, or hinge pin, journalled in the aligned apertures of the end-to-end-connected rows, connects adjacent rows together to form an endless conveyor belt capable of articulating about a drive sprocket.

In many industrial applications, articles are allowed to accumulate on a continuously moving conveyor belt before being off-loaded. Friction between the conveying surface of the moving belt and the accumulated articles causes the articles to push against each other increasing backline pressure. Backline pressure can cause damage to the articles, excessively load the conveyor belt and its drive components, and accelerate belt wear. Rotatable elements, such as rollers, in rolling contact with the undersides of conveyed articles have been used to reduce friction and lower backline pressure.

In other conveyor applications, articles must be pushed off the side of a constantly moving or stop-and-go conveyor belt. Rollers oriented with their axes of rotation in the direction of belt travel have been used to provide low friction rolling contact with the undersides of conveyed articles being pushed off the side of a conveyor.

One shortcoming of roller-top belts is that they are difficult to clean owing to the many surfaces and nooks and crannies associated with the rollers. Cleanability is especially important in some industries, such as meat-handling, where bacteria can form in and spread from difficult-to-clean areas.

Another shortcoming of many low backline pressure conveyors is the placement of a roller on the pivot rod. Such a placement requires fewer or thinner link ends resulting in less belt pull strength or narrow rollers resulting in high contact pressure on conveyed articles. Thus, there is a need for a modular conveyor belt that features low backline pressure or low-friction side transfer and that is easy to clean.

SUMMARY OF THE INVENTION

The present invention may include a series of rows of belt modules. A first one of the rows may have a plurality of hinge elements along an end of the first row. A second one of the rows may have a plurality of hinge elements along an end of the second row. The plurality of hinge elements of the first row may be interleaved with the plurality of hinge elements of the second row. A hinge pin may extend through the plurality of hinge elements of both the first row and the second row so as to pivotally join the first row to the second row.

A roller may be supported from a first module of the first row and supported from a second module of the first row, so that the roller resides between the first module and the second module and so that the roller extends above the modules in order to allow an object, which is to be conveyed by the conveyor belt, to be supported on the roller. An axle may extend through the roller. The axle may have a first end supported by the first module and a second end supported by the second module.

In an alternate embodiment, the rollers may be positioned in such a way that they extend through the top as well as the bottom side of the belt. This arrangement is designed to drive the rollers on the bottom side of the belt, either by moving the belt with the rollers over a stationary support plate or by moving it over a driving flat belt that can accelerate the rollers forward or backward and at various speeds.

BRIEF DESCRIPTION OF THE DRAWINGS

For a fuller understanding of the nature and objects of the invention, reference should be made to the accompanying drawings and the subsequent description. Briefly, the drawings are:

FIG. 9, which is a perspective view of an alternate embodiment of the module of the present invention;

FIG. 10, which is a perspective view of an alternate embodiment of the module of the present invention;

FIG. 11, which is a top plan view of a pair of adjacent modules with rollers installed; and, FIG. 12, which is a detailed view of a portion of one of the modules shown in FIG. 11.

FURTHER DESCRIPTION OF THE INVENTION

Figure 1A:
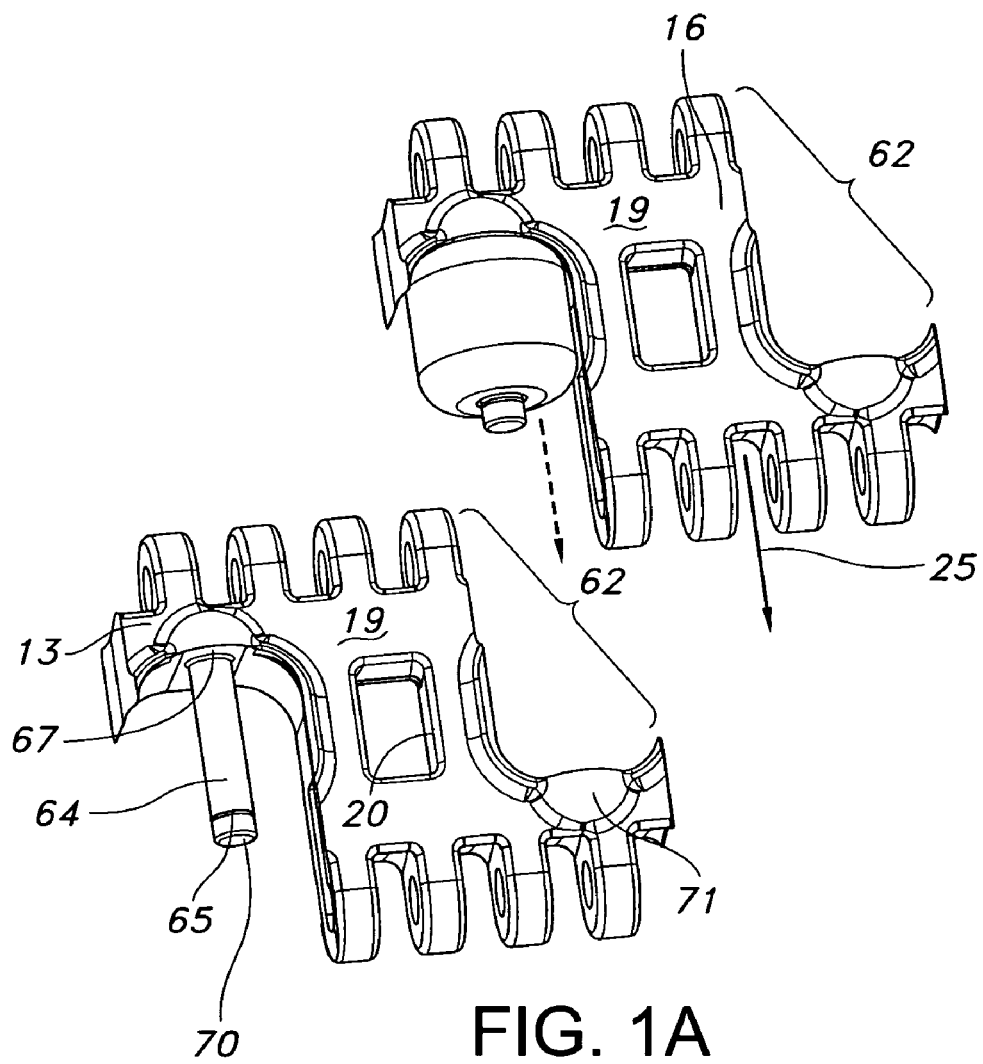
FIG. 1A, which is a perspective view of a pair of middle modules according to the present invention prior to assembly.
Figure 1B:
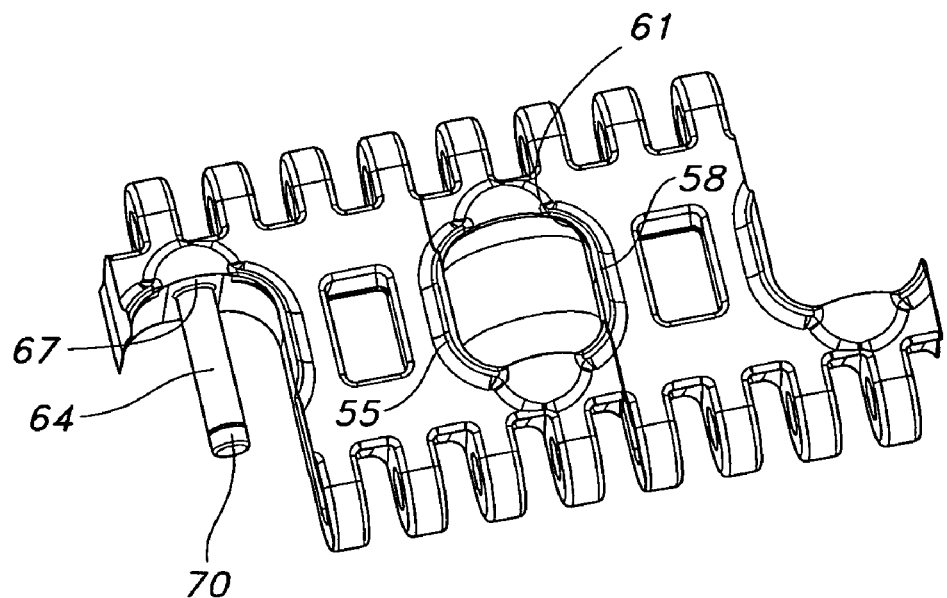
FIG. 1B, which is a perspective view of two modules with the roller assembled.
Figure 2A:
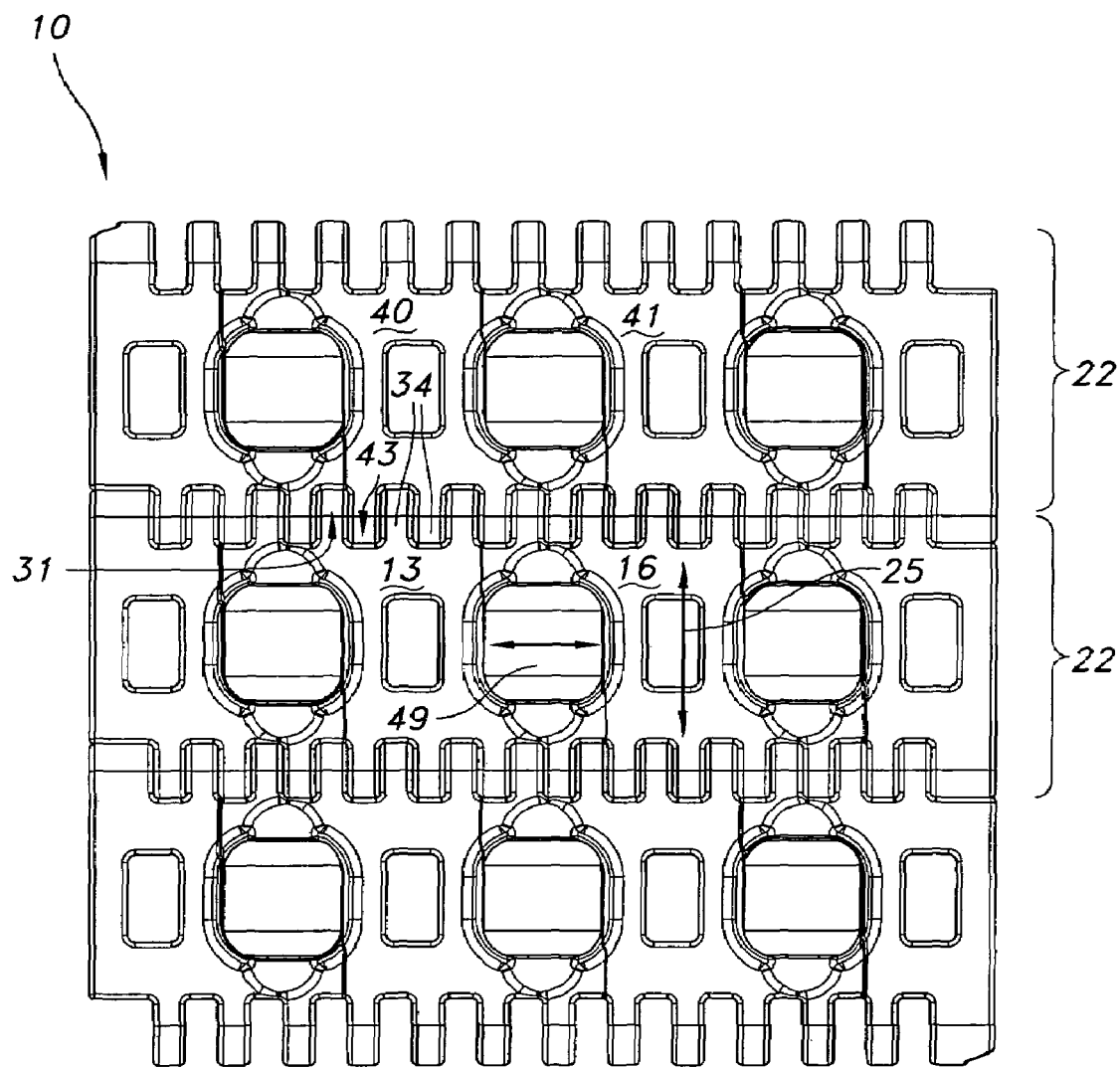
FIG. 2A, which is a plan view of a belt formed according to the present invention.

Referring generally to FIGS. 1A-12 and initially to FIG. 1A, a first module 13 and a second module 16 are shown prior to assembly within a row 22 (FIG. 2A) of a modular belt 10 (FIG. 2A). Each module 13, 16 may have a conveying surface 19. The second module 16 may be placed adjacent to the first module 13. The first module 13 and the second module 16 may be arranged in a row 22 of modules, the row 22 being oriented substantially perpendicular to a direction of belt travel indicated by arrow 25 (FIG. 2A) to extend across the conveyor belt 10. The modules 13, 16 may be moved in order to convey an object 28 (FIG. 6B) from a first location to a second location.

Turning to FIG. 2A, modules 13, 16 may be joined to form a portion of the belt 10. The belt 10 has openings 20 that can be engaged by teeth on a sprocket (not shown) to impart motion to the belt as will be understood by those skilled in the art based on this disclosure. The first module 13 may have a first end 31 that includes a plurality of link ends 34. Each link end 34 may have a transverse pivot rod opening 37 (FIG. 2B) therethrough. A juxtaposed module 40 may also have an end 43 that includes a plurality of link ends 34, each with a transverse pivot rod opening 37 therethrough. A pivot rod 46 (FIG. 2B) may extend through the openings 37 in order to form a hinge. In this manner, the juxtaposed module 40 may be pivotally joined to the first module 13. In the bricklayed arrangement shown in FIG. 2A, the second module 16 may also receive the pivot rod 46, and thereby pivotally join the second module 16 to the juxtaposed module 40. As shown in FIG. 2A, the second module 16 is also joined to a fourth module 41 that is in the same row as the juxtaposed module 40.

The conveyor belt 10 may further have a roller 49 supported from the first module 13 and from the second module 16. The roller 49 may extend beyond the conveying surfaces 19 in order to allow the object 28 to be supported by the roller 49. The roller 49 may have a substantially cylindrical contact surface 52 (see FIG. 2B), for contacting the object 28 being carried by the conveyor belt 10.

Returning to FIG. 1a, the first module 13 and the second module 16 have one or more substantially "L" shaped edges 62. When positioned next to a different module, a cavity 61 (FIG. 1b) may be formed, and part of the roller 49 may reside in the cavity 61. FIG. 1b depicts how an "L" shaped edge 62 of the first module 13 and an "L" shaped edge 62 of the second module 16 may define the cavity 61. An edge 55 may comprise a portion of the "L" shaped edge 62 corresponding to the first module 13. An edge 58 may comprise at least a portion of the "L" shaped edge 62 corresponding to the second module 16.

An axle 64 may extend through the roller 49. The axle 64 has a first end 67 and a second end 70. The axle 64 may be integrally molded as part of the modules and extending therefrom. The axle 64 may include a retaining ring 65 having a diameter that is greater than the diameter of the axle 64. Accordingly, the roller 49 can be preassembled onto the axle 49 prior to assembling the modules 13, 16 into a belt 10. With the integrally formed axle 64, the second end 70 is received in a hole 76 (FIGS. 8 and 8B) in the adjacent module. The modules 13, 16 may also be provided with a thickened portion 71 on opposite sides of the roller 49 so as to protect the roller 49 from side impacts during use. As shown in FIG. 1a, the roller 49 is mounted on axle 64 extending from the left hand side of module 16. The second end 70 is received in the opening in module 13 when the modules are assembled as shown in FIG. 1b.

Figure 2B:
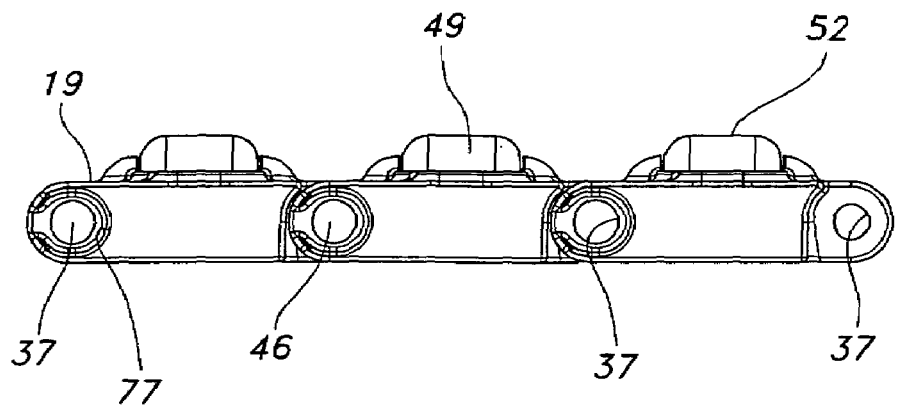
FIG. 2B, which is a side elevational view of the belt of FIG. 2A.

As shown in FIG. 2B, the rollers 49 extend above the conveying surface 19 of the belt 10. The end modules of the belt 10 include a recess 77 for rod retaining as will be evident to those of ordinary skill in the art based on this disclosure.

Figure 2C:
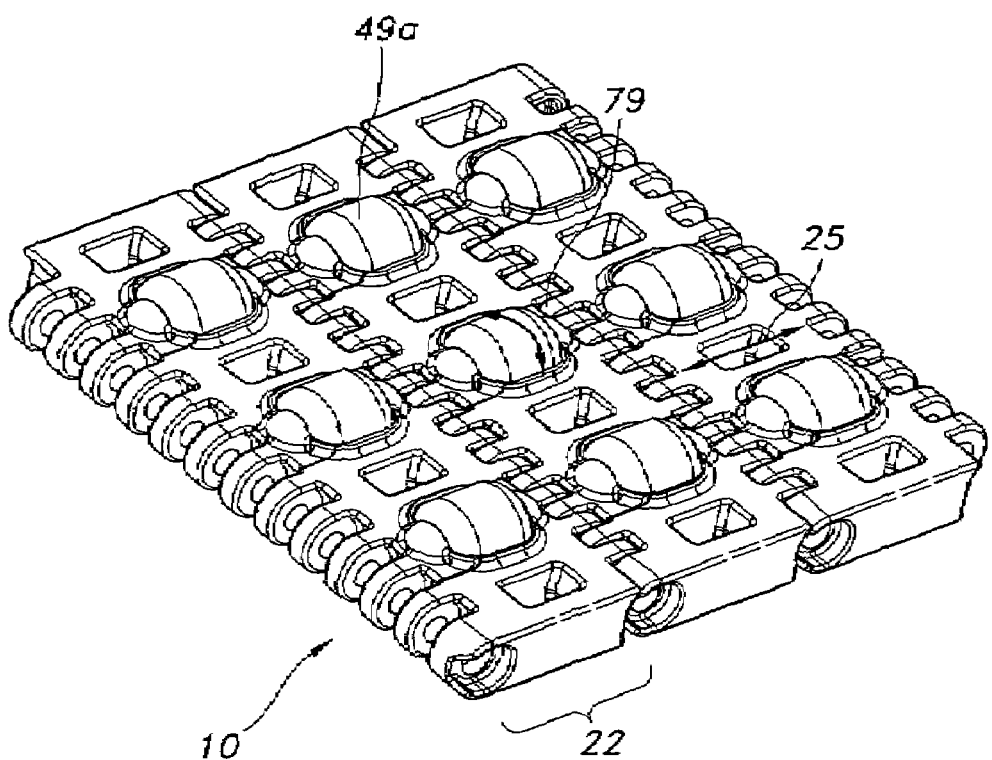
FIG. 2C, which is a perspective view of the belt of FIG. 2A.

FIG. 2C depicts one possible orientation of the rollers 49. The roller 49A has an axis 79 of rotation oriented substantially perpendicular or transverse to a direction of belt travel 25.

Figure 3:
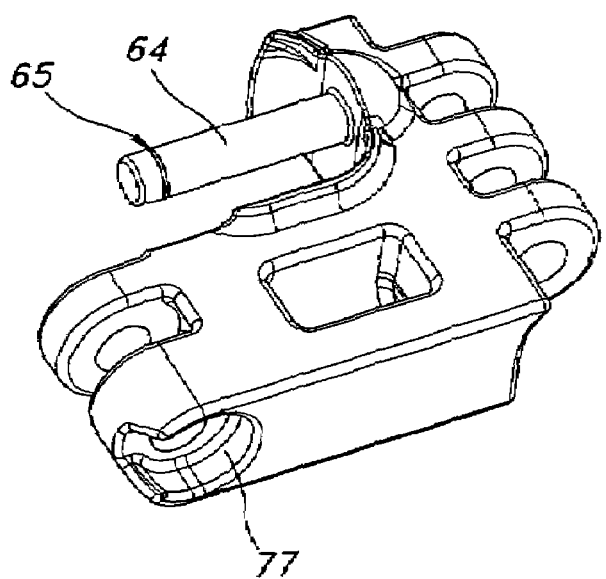
FIG. 3, which is a perspective view of an edge module having an axle oriented for a transversal roller.

FIG. 3 shows an end module with a recess 77 for rod retention as will be evident to those of ordinary skill in the art based on this disclosure. The axle 64 is positioned to receive a transverse roller 49A. Retaining ring 65 provides for pre-assembling the rollers 49A to the axles 64.

Figure 4A:
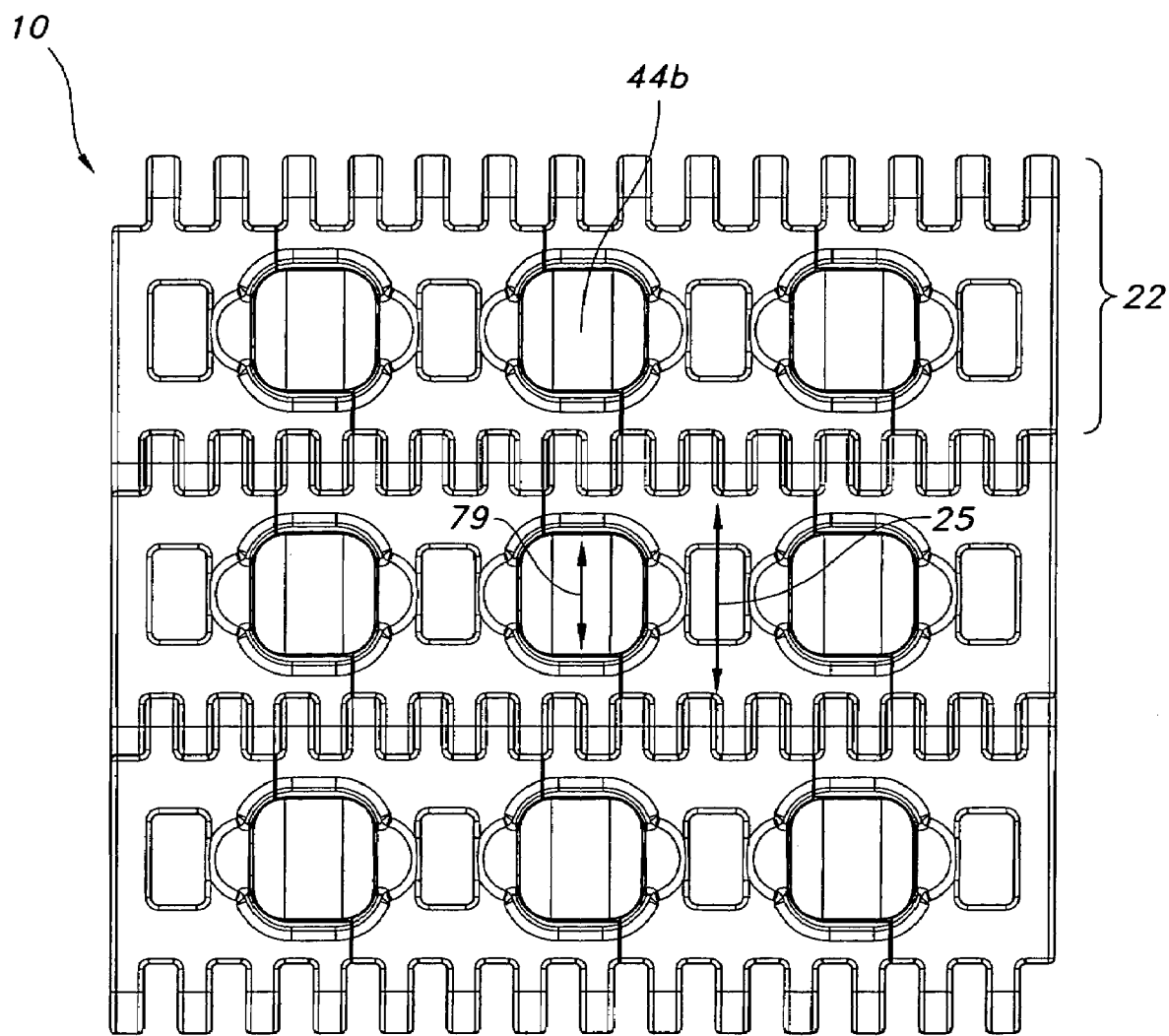
FIG. 4A, which is a plan view of an alternative embodiment of the present invention having longitudinal rollers.
Figure 4B:
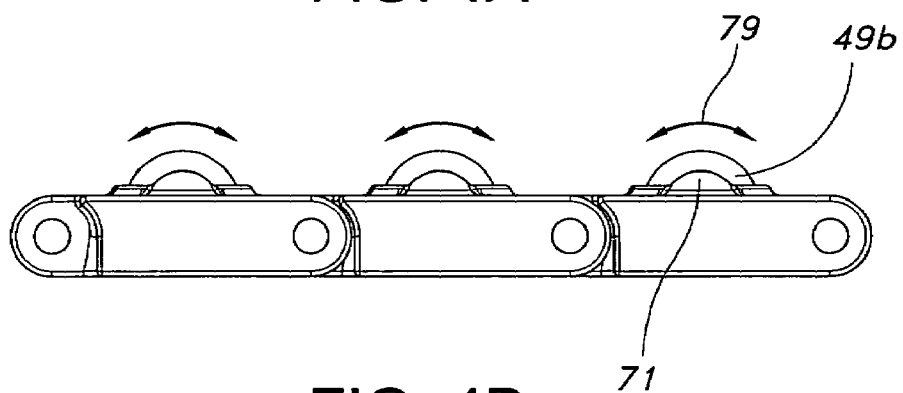
FIG. 4B, which is a side elevational view of the belt shown in FIG. 4A.
Figure 6A:
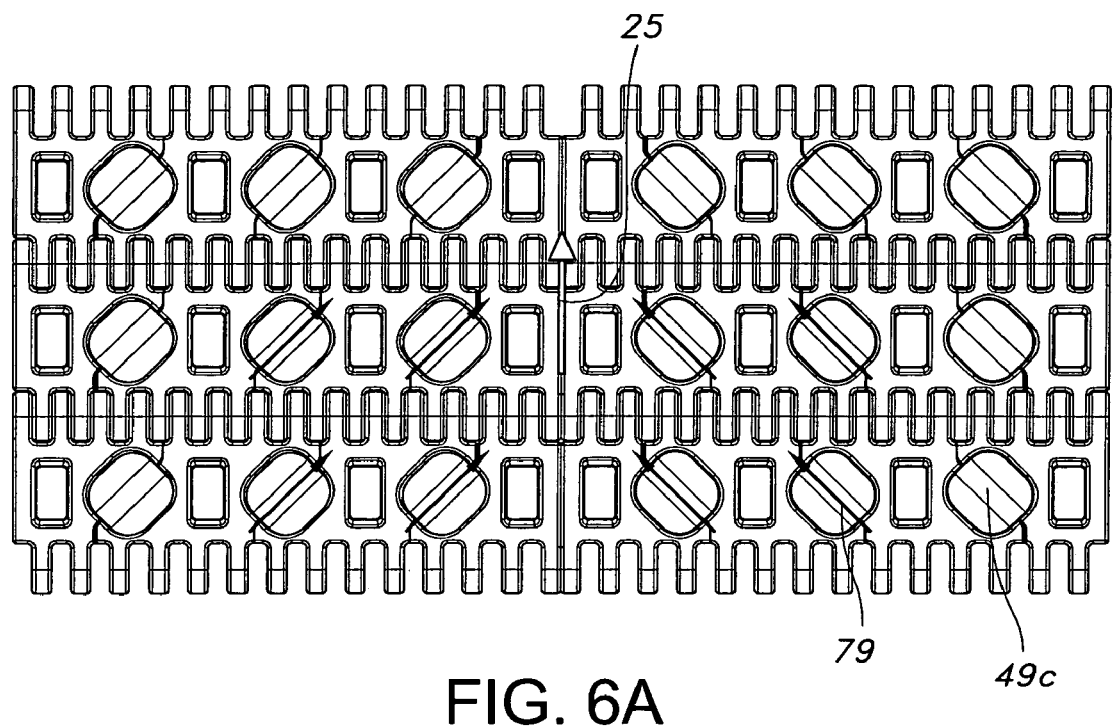
FIG. 6A, which is a plan view of a belt according to another embodiment of the invention.

In FIGS. 4A and 4B, roller 49B has an axis 79 of rotation that is substantially parallel to a direction of belt travel 25. In FIG. 6A, the roller 49C has an axis 79 of rotation that is oriented in a direction that is not perpendicular or parallel to a direction of belt travel 25. With such a belt 10, a force may be applied to an object 28 to cause the rollers 49 to rotate, and thereby allow the object 28 to move relative to the belt 10 in a desired direction.

Figure 5A:
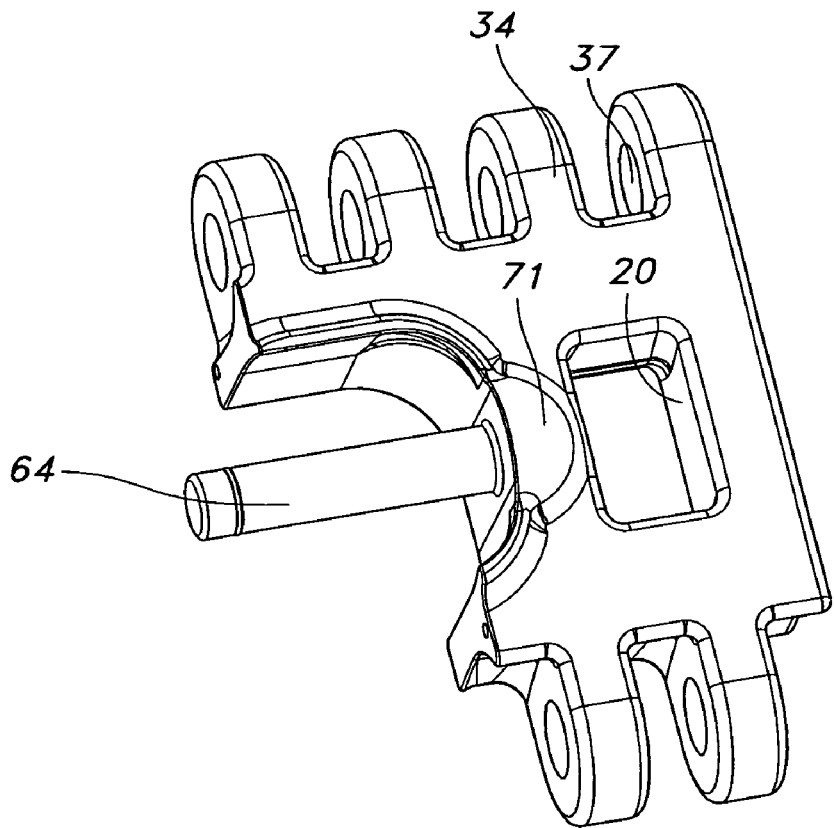
FIG. 5A, which is a perspective view of an edge module with an axle positioned for a longitudinal roller.
Figure 5B:
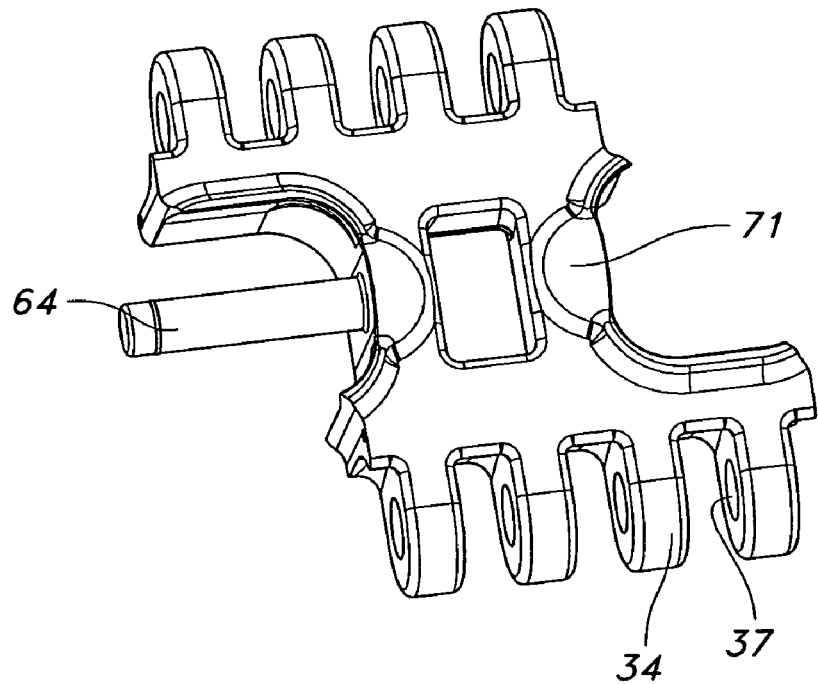
FIG. 5B, which is a perspective view of a middle module with an axle positioned for a longitudinal roller.

FIGS. 5A and 5B show an edge module and a middle module respectively. The axle 64 is positioned so as to provide for support of a longitudinal roller 49b with an axis of rotation 79 parallel to the direction of belt travel.

Turning to FIG. 6A, there is shown a belt 10 in which there are two orientations of the rollers 49. The rollers 49C have an axis 79 of rotation that is disposed at an angle of approximately 45 degrees to the belt travel direction 25. The rollers 49D have an axis 79 of rotation that is approximately equal and opposite to the angle for rollers 49C.

Figure 6B:
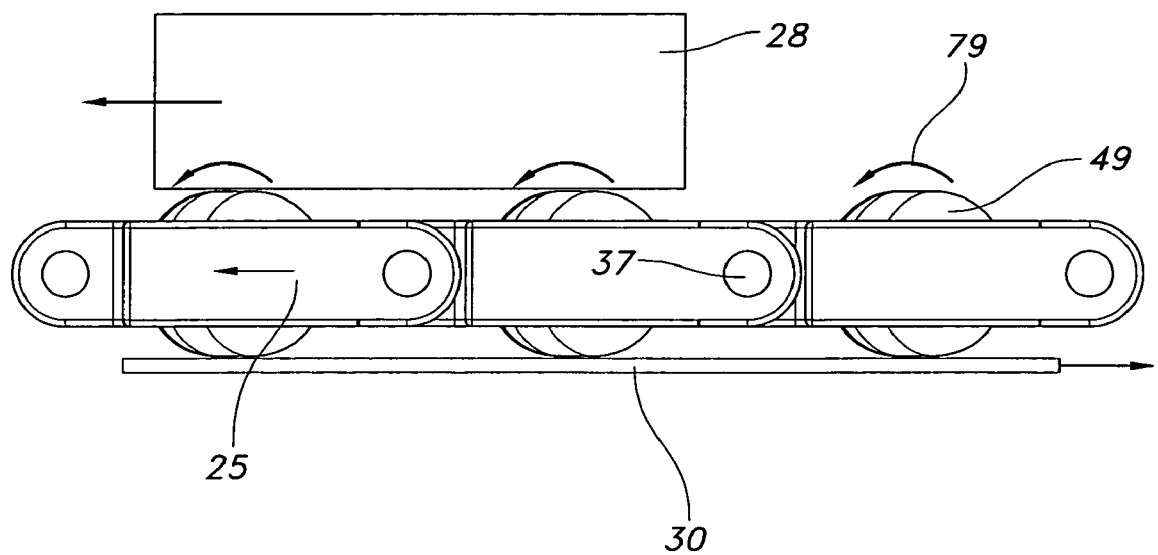
FIG. 6B, which is a side elevational view of a belt having active rollers.

FIG. 6B shows a belt 10 with active rollers 49C. The rollers 49C extend above the conveying surface 19 and extend below the bottom surface 29 of the belt 10. This arrangement is designed to drive rollers on the bottom side of the belt 10, either by moving the belt 10 over a stationary plate (not shown) or by moving it over a driving flat belt 30 which can accelerate the rollers forward or backward and at various speeds. The purpose of such operations is the centering of the goods on the middle of the belt or alternatively discharge of the goods sideways from the belt. It is also possible to have longitudinal or transverse rollers that extend above and below the belt 10.

Figure 7A:
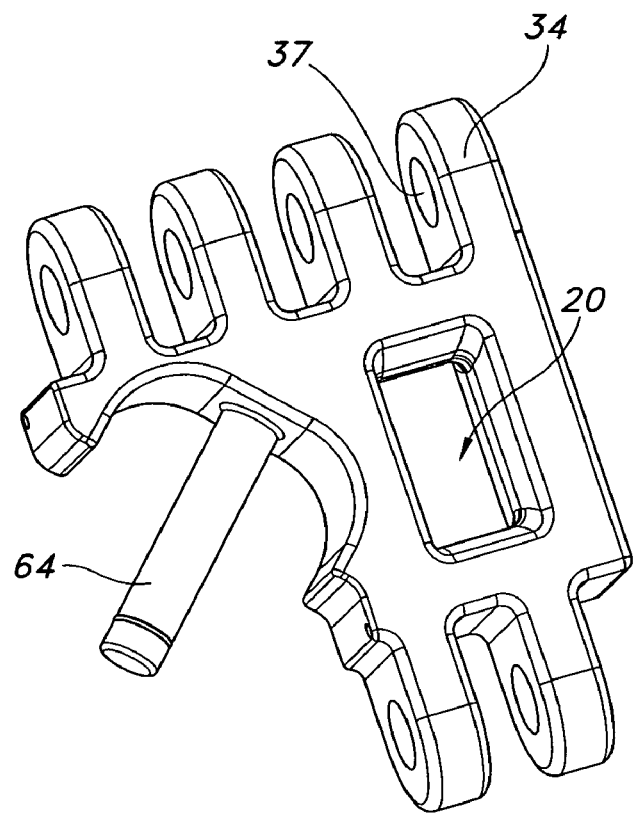
FIG. 7A, which is a perspective view of an edge module having an axle disposed at approximately forty-five degrees with respect to the direction of belt travel.
Figure 7B:
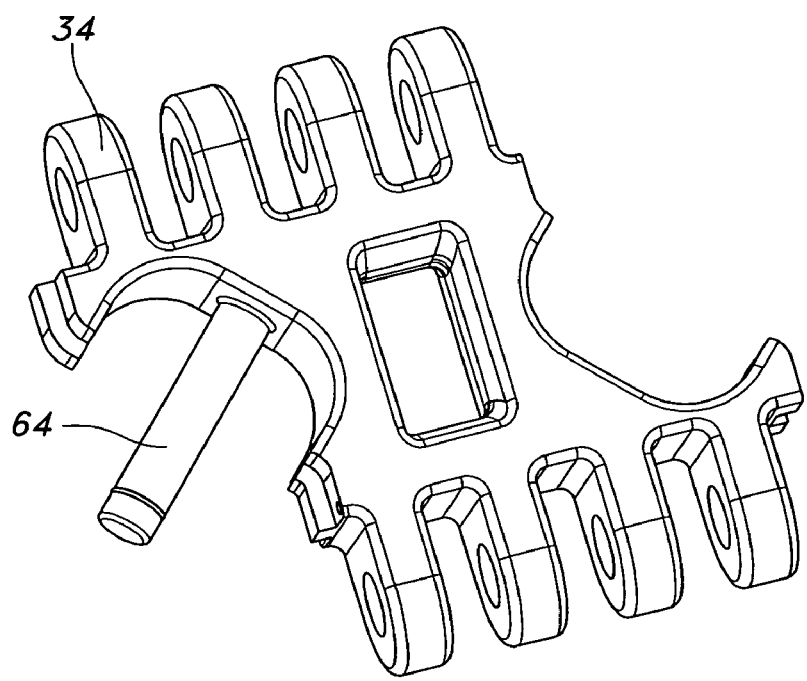
FIG. 7B, which is a perspective view of a middle module having an axle disposed at an approximately forty-five degree angle with respect to the direction of belt travel.

Turning to FIGS. 7A and 7B, an edge module and a middle module respectively are shown. The modules have an axle 64 oriented at an angle to provide support for rollers disposed at an angle of approximately forty-five degrees with respect to the direction of belt travel indicated by arrow 25.

Figure 8A:
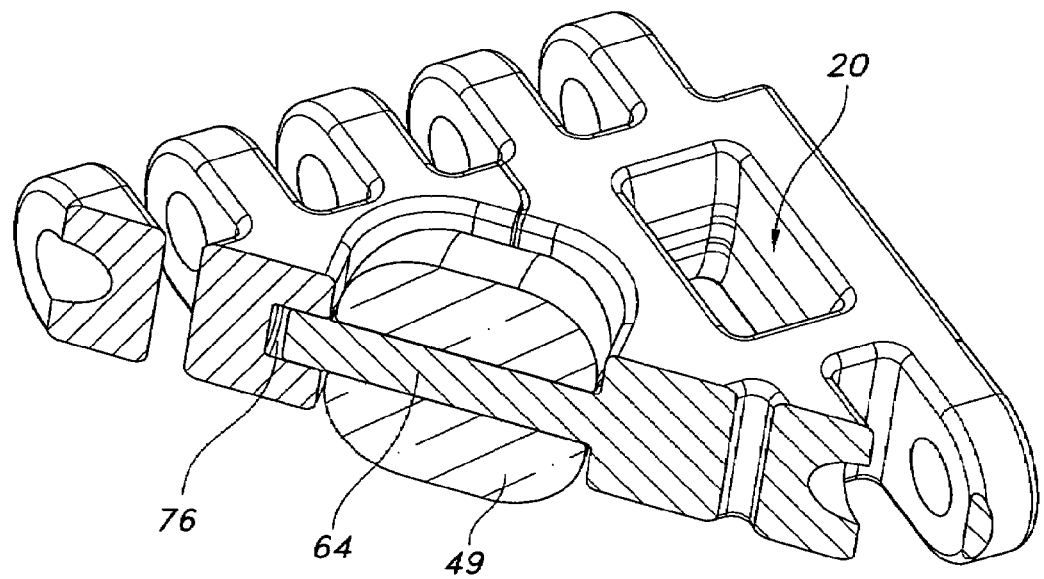
FIG. 8A, which is a cross-sectional view of a pair of assembled modules.
Figure 8B:
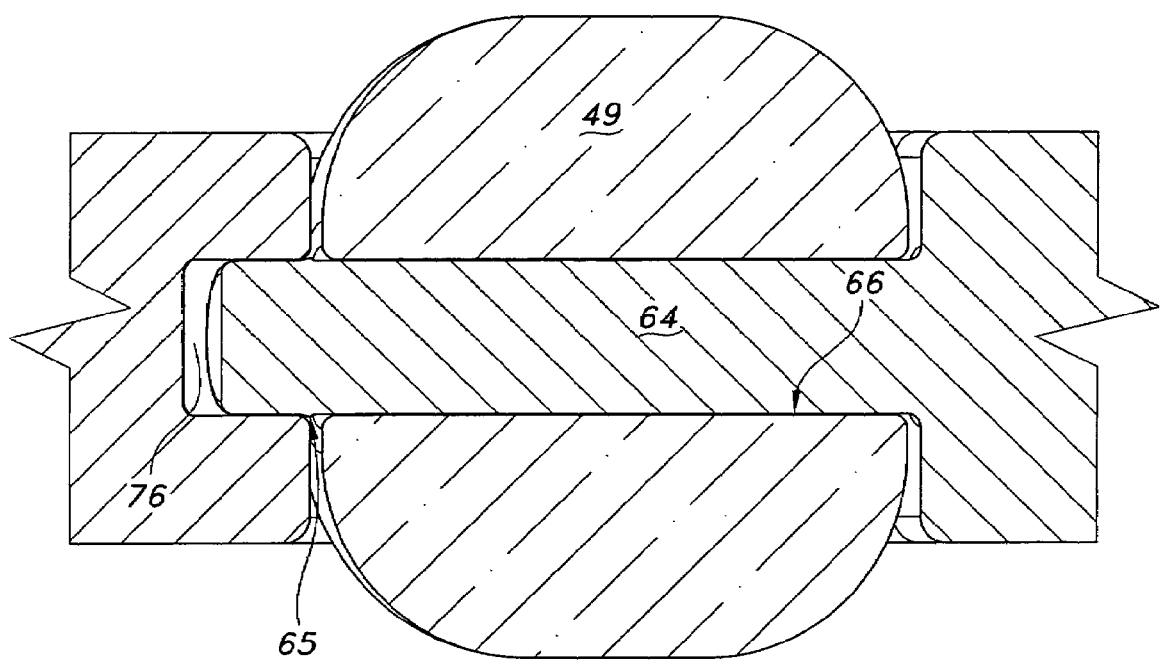
FIG. 8B, which is an enlarged cross-sectional view taken from FIG. 8A.

FIGS. 8 and 8B depict a roller 49 that may be used with the invention. The roller 49 depicted in FIG. 8B has an axle 64 that is integrally formed with and extends from the modules of FIG. 1a. The axle 64 has a retaining ring 65 disposed thereon. The retaining ring 65 has a diameter that is larger than the outside diameter of the axle 64. The diameter of the retaining ring 65 is slightly larger than the inside diameter of the bore 66 inside the roller 49. Accordingly, the roller 49 can be preassembled onto the axle 64 by sliding the roller 49 onto the axle 64 until the bore 66 in the roller 49 clears the retaining ring 65.

Turning to FIGS. 9-12, an alternate embodiment of the present invention is shown. Module 100 has a first plurality of link ends 103 extending in a first direction and a second plurality of link ends 106 extending in a second direction opposite the first direction. The first and second link ends 103, 106 are offset such that the first link ends 103 of a first module 100 are capable of intercalating in the spaces between the second link ends 106 on an adjacent module. The link ends 103, 106 have a plurality of transverse openings 109 capable of aligning when adjacent modules are intercalated. A pivot rod (not shown) may be inserted through the aligned openings 109 to form a hinge between rows of modules 100. On the left hand side of FIG. 9, an axle 112 extends inside an L-shaped opening 115 formed in the module 100. A protuberance 118 extends from an end wall 121 of module 100. Another protuberance 124 extends from a wall 127 bordering the L-shaped opening 115.

Turning to FIG. 10, the right hand side of the module 100 has recesses 130 and 133 that correspond to the protuberances 118 and 124. Recess 130 is disposed on a portion of the wall 125 that defines the second L-shaped opening 129 on the module 100 and is sized to receive the protuberance 118. Recess 133 is disposed on end wall 136 positioned at the right hand side of the module 100. Recess 133 is sized to receive protuberance 124. An opening 137 is sized to receive the distal end of the axle 112.

In FIG. 11, a pair of modules 100 are shown in side-by-side relation prior to installation. As shown, the protuberance 118 on the module 100 on the right side of the figure slides into the recess 130 on the module 100 on the left hand side of the figure. Also, protuberance 124 on the module 100 on the right hand side of the figure slides into recess 133 on module 100 on the left hand side of the figure. The engagement of the protuberances 118, 124 with the recesses 130, 133 provides for alignment of the adjacent modules 100. The protuberance 124 provides an additional function as it extends slightly beyond the edge of a roller 140 when the roller 140 is installed in the module as shown in FIGS. 11 and 12. The roller 140 can be pre-installed on a module 100 by sliding it onto the axle 112. The width of the roller 140 is designed so that it is capable of being forced onto the axle 112 by sliding it past the protuberance 124. However, once the roller 140 is inserted onto the axle 112 it is obstructed from sliding off of the axle 112 by protuberance 124. The roller 140 extends beyond the protuberance 124 by a distance A as best shown in FIG. 12.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A conveyor belt, comprising:
a first module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a second module adjacent to the first module, the second module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a roller supported from the first module and the second module, the roller extending beyond the conveying surfaces in order to allow an object, which is to be conveyed by the conveyor belt, to be supported by the roller, wherein the first module and the second module are arranged in a row, the row being oriented to extend across the conveyor belt substantially perpendicular to a direction of belt travel, wherein an edge of the first module and an edge of the second module define at least a portion of a cavity in which the roller resides; further comprising an axle extending through the roller, and wherein the axle is integrally formed on the first module.

2. A conveyor belt, comprising:
a first module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a second module adjacent to the first module, the second module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the second module having a conveying surface;
a roller positioned on an axle extending therethrough, at least a portion of the axle being integrally formed on the first module, the roller extending beyond the conveying surfaces in order to allow an object, which is to be conveyed by the conveyor belt, to be supported by the roller.

3. The conveyor belt of claim 2, wherein the first module and the second module are arranged in a row, the row being oriented to extend across the conveyor belt substantially perpendicular to a direction of belt travel.

4. The conveyor belt of claim 3, wherein an edge of the first module and an edge of the second module define at least a portion of a cavity in which the roller resides.

5. The conveyor belt of claim 4, wherein at least one of the edges is substantially "L" shaped.

6. The conveyor belt of claim 2, wherein the roller includes a substantially cylindrical contact surface.

7. The conveyor belt of claim 2, further comprising an axle extending through the roller.

8. The conveyor belt of claim 7, wherein the axle has a first end and a second end, the first end being supported from the first module, and the second end being supported from the second module.

9. The conveyor belt of claim 7, wherein the axle includes a retaining ring and the roller includes a corresponding bore.

10. The conveyor belt of claim 7, wherein the retaining ring is disposed in spaced apart relation to the distal end of the axle.

11. The conveyor belt of claim 2, wherein the roller has an axis of rotation oriented substantially parallel to a direction of belt travel.

12. The conveyor belt of claim 2, wherein the roller has an axis of rotation oriented substantially perpendicular to a direction of belt travel.

13. The conveyor belt of claim 2, wherein the roller has an axis of rotation oriented in a direction that is not perpendicular or parallel to a direction of belt travel.

14. The conveyor belt of claim 2, wherein the first module and the second module have a bottom surface.

15. The conveyor belt of claim 14, wherein the roller extends beyond the conveying surfaces and the bottom surfaces.

16. The conveyor belt of claim 15, where the roller has an axis of rotation oriented in a direction that is not perpendicular or parallel to a direction of belt travel.

17. A conveyor belt, comprising:
a first module having an intermediate section, the intermediate section having a first opening defined therein by a first sidewall, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a second module adjacent to the first module, the second module having an intermediate section, the intermediate section having a second opening defined therein by a second sidewall, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a roller positioned on an axle extending therethrough, the axle has a first end supported from the first module and a second end supported from the second module, the roller extending beyond the conveying surfaces in order to allow an object, which is to be conveyed by the conveyor belt, to be supported by the roller, at least a portion of the roller positioned inside a cavity formed by the first and second sidewalls.

18. A conveyor belt, comprising:
a first module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a second module adjacent to the first module, the second module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a roller supported from the first module and the second module, the roller extending beyond the conveying surfaces in order to allow an object, which is to be conveyed by the conveyor belt, to be supported by the roller; wherein one of the first and second modules has at least one protuberance disposed thereon and one of the first and second modules has a recess defined therein capable of receiving the protuberance such that the first and second modules are disposed in alignment by means of engagement between the protuberance and the recess.

19. The conveyor belt of claim 18, further comprising an axle extending through the roller, and wherein the axle is integrally formed on the first module.

20. The conveyor belt of claim 19, wherein the at least one protuberance prevents the roller from sliding off of the axle such that the roller can be pre-installed on the axle prior to joining the first and second modules.

21. A method of conveying an object, comprising:
providing a first module and a second module, each module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
providing a roller supported from the first module and the second module so that a portion of the roller extends beyond the conveying surfaces;
supporting an object on the roller;
moving the modules in a belt travel direction in order to convey the object from a first location to a second location.

22. A conveyor belt, comprising:
a first module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a second module adjacent to the first module, the second module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a roller supported from the first module and the second module, the roller extending beyond the conveying surfaces in order to allow an object, which is to be conveyed by the conveyor belt, to be supported by the roller; and,
wherein one of the first and second modules has an axle integrally formed thereon, the axle extending through the roller.

23. A conveyor belt, comprising:
a first module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a second module adjacent to the first module, the second module having an intermediate section, a first plurality of link ends extending from the intermediate section in a first direction, and a second plurality of link ends extending from the intermediate section in a second direction opposite the first direction, the first and second plurality of link ends having transverse pivot rod openings defined therein, the first module having a conveying surface;
a roller positioned on an axle extending therethrough, the axle has a first end supported from the intermediate section of the first module and a second end supported from the intermediate section of the second module, the roller extending beyond the conveying surfaces in order to allow an object, which is to be conveyed by the conveyor belt, to be supported by the roller.

* * * * *